Ralph Weir
INVENTOR.

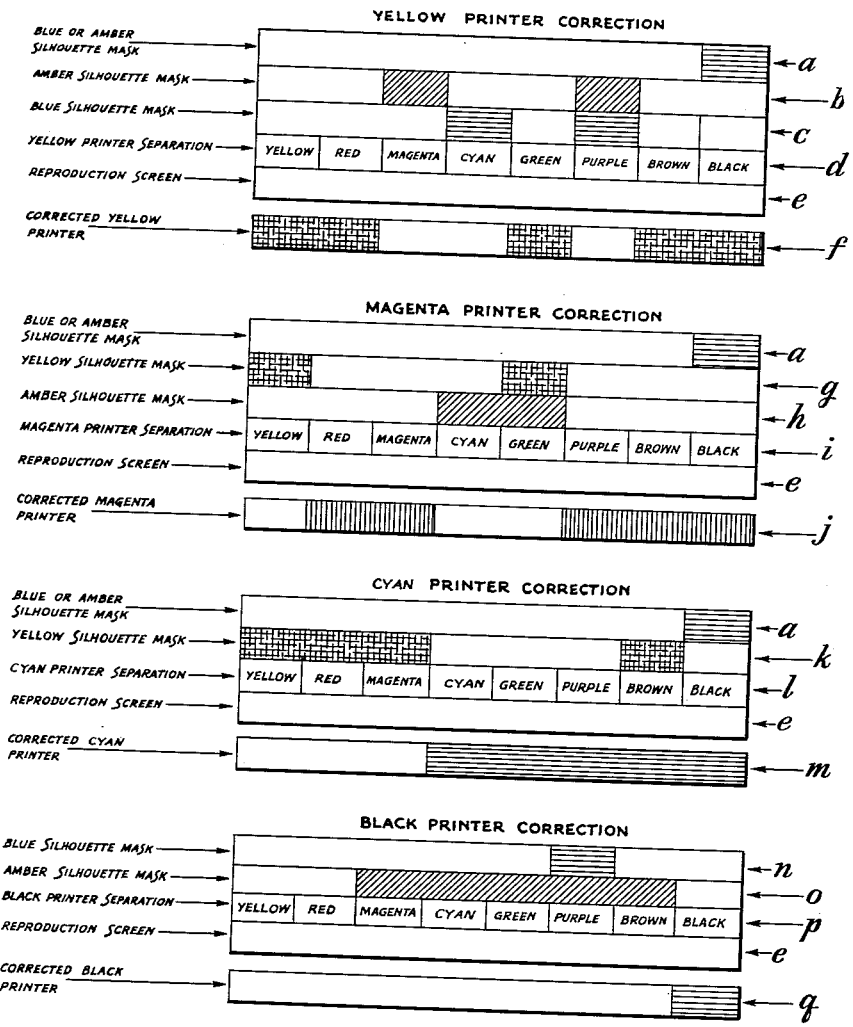

3,022,164
REPRODUCTION OF COLOR DRAWINGS, FILM TRANSPARENCIES AND PHOTOGRAPHS
Ralph Weir, 1306 Evergreen St., Chicago, Ill.
Filed Sept. 25, 1956, Ser. No. 611,954
22 Claims. (Cl. 96—30)

My invention relates to the reproduction of colored graphic material and film transparencies in printed form, and more particularly to the correction of unbalanced color separations used for the production of color printers. Two methods of color correction are used to overcome the distorted color values, neither of which fully accomplishes the desired result of rebalancing the color values to their proper relationship. These are: color correction by handwork and correction by photomechanical continuous tone masks made from the improperly balanced separation. Hand correction is a highly skilled art. It is time consuming, expensive and in many cases impossible on subjects containing intricate detail in colored areas. Hand correction is accomplished by staining the separation negative or etching the printer positive to increase or decrease color intensities. It is governed entirely by the skill or judgment of the retoucher. Although it is time consuming and expensive, its greatest fault lies in the fact that it is not controllable to any degree of accuracy nor does it provide a simple method of correction for errors in judgment or skill on the part of the retoucher. If, after proofing, the hand corrected separations show errors, it is often impossible to rectify the mistakes, in which case the work must be started anew. Staining is usually done on each continuous tone separation negative. The stain is applied by hand in stronger or weaker applications to obtain the desired density. Chemical etching is done on negatives to increase color saturation by reducing density and on positives to reduce contamination of unwanted colors. Application of either or both methods involves skill and considerable guesswork. Further, it is impossible to correct all areas of a given color if the original to be reproduced has even a moderate amount of fine detail.

In considering color correction by continuous tone, photographic masking is more flexible and less expensive than the hand method but is limited in its ability to overcome color distortion. Its greatest advantage is in its ability to duplicate the detail of the original to be reproduced. Its greatest fault lies in its inability to correct distorted colors without injuring those which are correct in the color separations. Reproductions from uncorrected separations, either by continuous tone masks or handwork, appear muddy and degraded because of oversaturation in colors that photographed darker than the pure printing color. In relation to the black record, the wanted color photographs at approximately seventy-five percent with all lighter shades diluted in proportion.

The most common color errors that are manifested in reproductions from uncorrected separations are: excess of yellow in magenta, cyan, green, purple, brown and black; excess of magenta in yellow, cyan, green, purple, brown and black; excess of blue in yellow, red, green, purple and black. In four-color process the use of an uncorrected black printer contaminates all other colors mentioned above.

There are three major objectives in perfect reproduction of colored original which present standard filtered separations fail to attain. First, the A, B and C filtered separations, which produce the cyan (blue), magenta and yellow printers, respectively, should record the pure solid printing colors at least to that of the black areas of the original. (Standard separations record only 72% to 76% of the wanted solid color in relationship to the 100% record of black in the separations.) Secondly, the printer separation negative must lighten or eliminate the unwanted or complementary colors; and, thirdly, the color saturation must be balanced in its mixtures. In comparison to solid black at 100%, the proportions of the other colors in the accepted standard filtered separations are approximately:

C filter—Yellow printer:
  Black 100; yellow 76; magenta 65; cyan 30; green 90; purple 76; brown 91
B filter—Magenta printer:
  Black 100; yellow 5; magenta 72; cyan 35; green 41; purple 85; brown 84
A filter—Cyan (blue) printer:
  Black 100; yellow 3; magenta 3; cyan 76; green 88; purple 85; brown 50

In some printing methods a fourth or black plate is necessary to give depth and form to the reproduction. The black printer is usually made with a K filter. The relationship between black and colors in this printer negative is approximately:

K filter—Black printer:
  Black 100; yellow 4; magenta 38; cyan 45; green 60; purple 90; brown 55

The above figures are based on balanced separation negatives having reasonably similar end densities. To accomplish this, it is essential that rigid control be maintained in room temperature, light source output, developer temperature, exposure and development times and rate of agitation in development. In a large majority of photographic plants having the most modern temperature and humidity controls, electronic exposure and light control devices and highly skilled craftsmen to attend the human operations of judgment in processing, it is the exception rather than the rule that balanced separations and correctly proportioned continuous tone masks are produced with consistency.

It has long been recognized that a practical solution to the problem would necessitate a photomechanical masking system to substitute for the handwork and guesswork of prevailing methods. Color correction could be simply accomplished with continuous tone masks if all color errors photographed proportionately on all separations. The basic principle of continuous tone masking is to produce one or more masks from the original separations or from additional separations made with complementary filters. The purpose of the mask is to correct the insufficient densities in areas of certain colors which the original separations do not produce in correct relationship to the wanted colors. Since the continuous tone mask made from one separation is used in the correction of another, it is obvious that a high degree of control is necessary if standardization is to be accomplished. Mask strength is vitally important in any system of correction, yet it is difficult to consistently develop continuous tone masks to precise percentages of density with even normal processing variables. It is often necessary to make several masks before continuous tone masks of suitable density are produced. Masking has progressed to the point where almost every conceivable application has been tried. These methods have ranged from single basic masks to multiple and masked masks, all in continuous tone. Masks have been used in contact with the separation to be corrected and spaced a distance from it. They have been registered directly on the sketch, and have been placed between the sketch and the sensitive material to be exposed. Some of the more complex systems employ: projection of negative and positive continuous tone images on the original during exposure; and partial exposure through continuous tone masks placed in front of the separation to be processed, then exposing through a plurality of filters not only to the original but also a blank white sheet to help control contrast. Separations have been exposed, fixed, dried and resensitized with colodion emulsion, then reexposed through different filters to the original. Because continuous tone masking connot completely correct a specific color without in some way damaging another, the improvements merely shifted the degree of correction to different areas of the spectrum. Attempts have been made to overcome this fault with preliminary continuous tone masks to withhold densities in certain areas while exposing a new type "Masked Masks." While this made possible hundreds of combinations of mixed percentages, it did not standardize masking procedure.

To avoid the multiplicity of masks, methods were devised to make color correction an integral part of the printer separation by using silver or dye image continuous tone masks as part of a system of filter combinations and multiple exposures. To eliminate extra separation negatives with special filters, continuous tone positive masks have been produced by exposure to the original and reversing the image in processing or by using autopositive materials. Panchromatic material must be used which makes it extremely difficult to develop to precise densities in total darkness. While these methods reduced the number of masks by more complicated and time consuming processing operations, the resulting corrections were essentially the same as multiple masking. Some systems used the original silver image of the continuous tone masks while others recommended clear dye image continuous tone masks to eliminate diffusion caused by silver grain. Dye coupling has been used to process continuous dye image masks for the purpose of correction during exposure of the printer color separations. The disadvantage in all methods which employ either silver or dye image continuous tone masks as a step in the progression of production of the actual color separations is that unacceptable quality in the printed result demands rephotographing of the original to produce new masks and subsequent separations. A simple continuous mask for each of the printer separation negatives can completely correct color distortions by eliminating the unwanted or complementary colors when reproducing an original which contains only the pure printing colors—yellow, magenta, cyan. For the purpose of a more complete analysis, a hypothethical original containing all the pure printing colors plus their mixtures will give a truer demonstration of the capabilities of continuous tone masking for color correction. A controlled and balanced set of separations from a color original will approximate the color relationships previously mentioned, which shows the printing colors, yellow, magenta, cyan, at less than the solid necessary for full color reproduction.

The tabulation below reveals the approximate proportions of each color to the wanted printer color when it is increased to one hundred percent saturation:

C filter—Yellow at 100%; black—130%; magenta—84%; cyan—39%; green—117%; purple—99%; brown—118%

B filter—Magenta at 100%; black—140%; yellow—7%; cyan—49%; green—57%; purple—119%; brown—118%

A filter—Cyan at 100%; black—130%; yellow—4%; magenta—4%; green—114%; purple—110%; brown—65%

K filter—Cyan at 100%; yellow—4%; magenta—38%; blue—45%; green—60%; purple—90%; brown—55%

Further computation shows the following specific errors percentagewise in each printer if reproduced by three-color process, i.e., yellow, magenta and cyan (blue):

Yellow printer:
  Oversaturation—black 30%; green 17%; brown 18%
  Contamination—magenta 84%; cyan 39%; purple 99%
Magenta printer:
  Oversaturation—black 40%; purple 19%; brown 18%;
  Contamination—yellow 7%; cyan 49%; green 57%
Cyan (blue) printer:
  Oversaturation—black 30%; green 14%; purple 10%
  Contamination—yellow 4%; magenta 4%

The most commonly used reproduction processes employ a fourth color by the addition of a black printer. In this type of reproduction, it is necessary to remove as much of the other colors under black solids as will avoid a piling of impressions which result in a muddy reproduction of deep colors. This is especially true in multicolor high speed printing where wet colors are applied over each other and mixing of wet inks must be avoided by removing unnecessary color from under the black impression.

In attempting to correct the yellow printer separation of a hypothetical sketch by continuous tone masking, it is necessary to obtain a mask having the best image of colors which are degraded by the addition of yellow. It should not contain any image of colors which require yellow in their mixture. In comparison to yellow represented at 100%, the yellow printer correction requires a mask of such percentage of intensity as to remove 84% in magenta, 39% in cyan, and 99% in purple to approximate the insufficiency of density in these colors of the separation. Further, green and brown are oversaturated by 18% and black must be reduced to equal 100% yellow for three-color process and substantially more if for four-color reproduction. No continuous tone mask can be made from any single separation that obtains an image of only these colors in the proportions mentioned. Nor can any combination of masks be produced by separations from special filters, multiple exposures or more complex means, to closely approximate the ratios needed for proper correction of each specific color only. A continuous tone mask from the magenta printer negative with 84% of the density of the solid yellow of the yellow printer in the magenta areas could remove unwanted yellow in the magenta and purple areas if it is combined with the yellow printer negative. However, this mask would remove a like amount of yellow from the brown areas which require 100% yellow in their mixture. Likewise, a continuous tone mask from the cyan printer negative when used in combination with the yellow printer negative cannot remove yellow from cyan and purple areas without eliminating a like amount from the 100% yellow required to produce the green areas. The same obstacles are present in greater or lesser degree when unbalanced proportions of color areas in the other printer separations are corrected by continuous tone masking. Add to these complications the need for different proportions of correction in black areas to comply with three and four-color process requirements.

The novel process has for its main object to provide a series of master masks, made by exposing color separations to contrasty orthochromatic emulsion of the Eastman Kodalith type each of which bears a photographic silhouette silver image representing areas of a certain color contained in the original to be reproduced.

A further object is to provide a combination of corrective silhouette masks made from the master series, which when used in connection with a dye colored variable opacity reproduction screen, can change the contrast and density in areas where photographic filters and emulsions have distorted the color balance in the separation negatives from which the original must be reproduced.

Another object of the process is to provide a combination of transparent dye receptive masks made from the master silhouette masks, each of a different color, which, when combined with a dye colored variable opacity reproduction screen, utilizes the screen as a secondary filter by adding its color to those of the masks which can, in combination, change the contrast characteristic of the original screen.

An additional object is to make possible by this new method a novel application of existing dye colored variable opacity reproduction screens, for color work.

An important object is to provide silhouetted photographic silver image masks of such nature that they record selected colors individually and are of substantial opacity rather than in graduated tones, thereby furnishing a choice of masks which can be assembled in a combination that will affect and alter only the improperly balanced color areas in filtered separations.

A still further object is to provide master silver image silhouette masks of reasonably uniform opacity, which can eliminate employing black or dyed continuous tone images made from standard separations having the common error of recording wanted and unwanted colors in unbalanced proportion to each other, thus creating a mask that can correct certain color balances only at the expense of further distorting the other wanted or unwanted colors.

Another object is to provide a selected combination of corrective masks each of a different transparent dye color which, when superimposed over the separation to be corrected and exposed to sensitive photographic material through a dye colored variable opacity reproduction screen, form a multicolored screened image in certain color areas of the reproduction, thus transforming the normal contrast of the screen in those areas to the proper contrast needed to correct the degraded colors.

An additional object is to provide masks with a pattern of dye receptive deposits which will accept full color saturation, to consistently produce a predetermined contrast in areas containing colors whose balances have been distorted by photographic filters or emulsions.

A still further object is to eliminate the unreliable guesswork and time consuming handwork in color correction methods that do not employ masks.

In the accompanying drawings FIGS. 1 to 4 illustrate graphically the principle upon which the invention is based.

Figure 2:
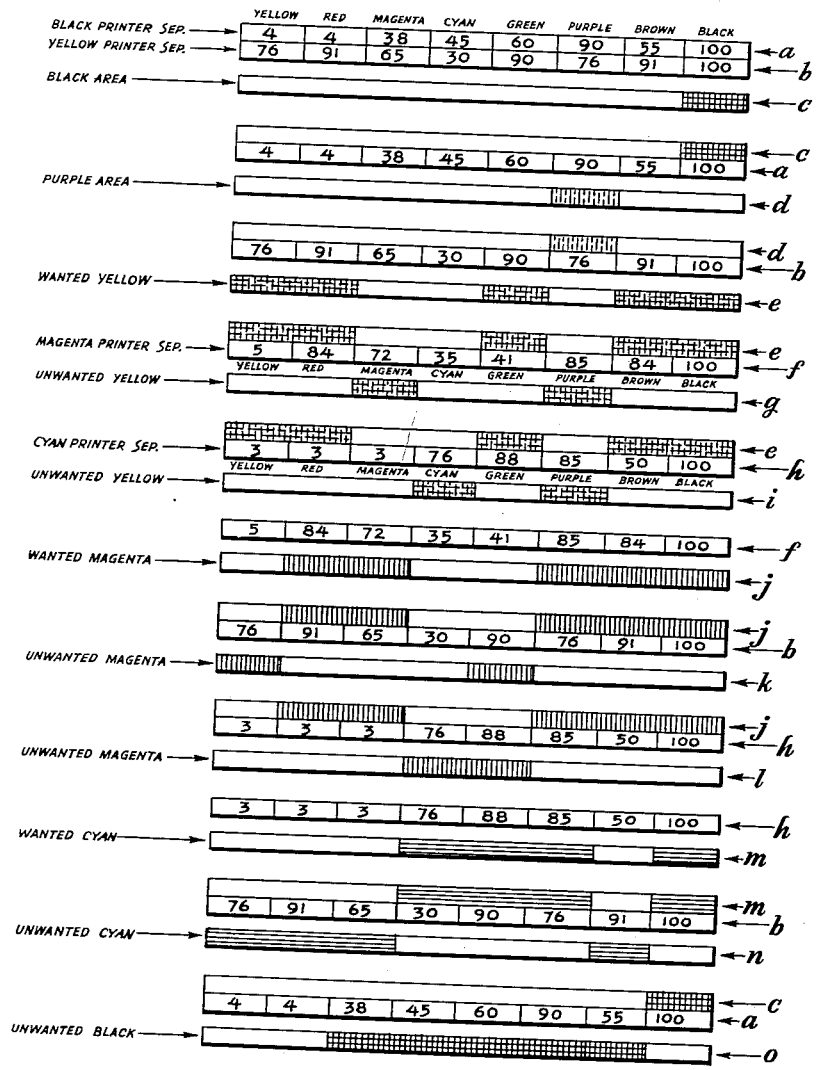
FIG. 2 is a chart illustrating the steps involved in separating unwanted colors from wanted ones in order to obtain the master silver image silhouette masks required for production of the transparent dye corrective masks used to adjust the printer separations.
Figure 3:
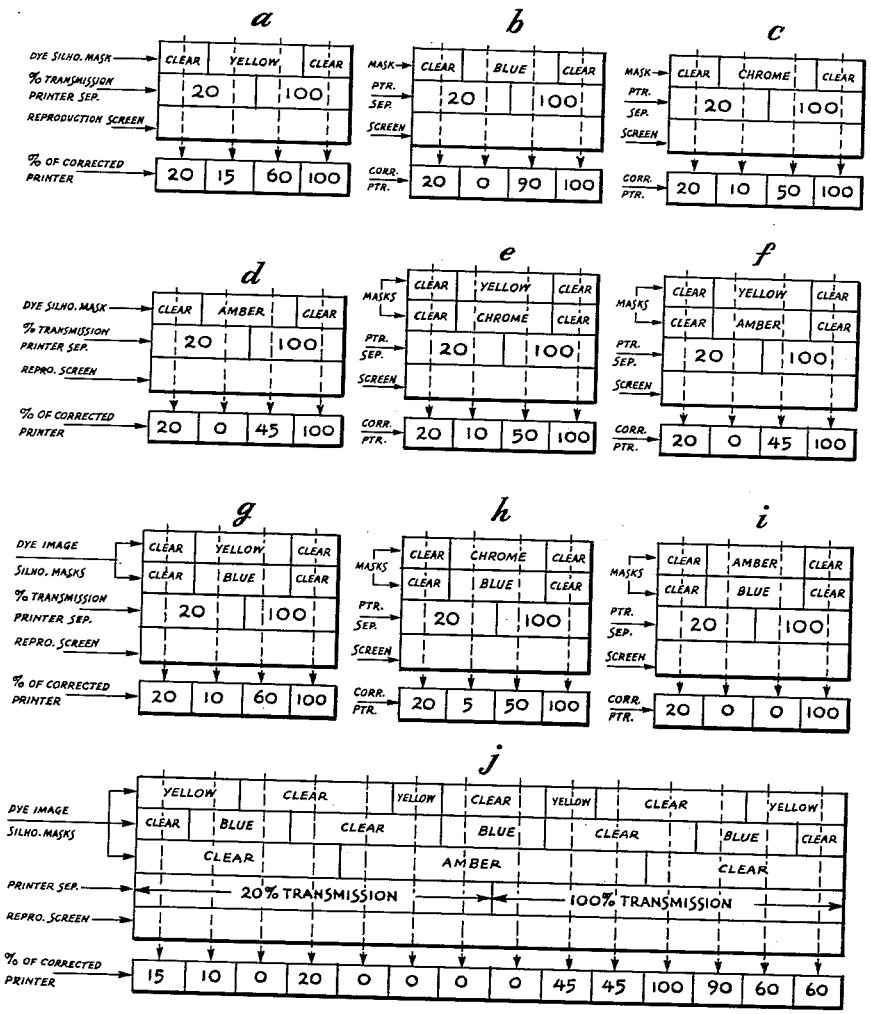

FIG. 3 is a chart indicating the effects of differently colored transparent dye silhouette masks, used singly or in combination, when exposed through a dye colored variable opacity reproduction screen; and FIG. 4 is a chart illustrating the application of the corrective mask combinations and transparent dye colors needed to correct the separation negatives, in order to obtain properly balanced printers. A description of the actual production, processing and novel application of the silhouette masks in color corrections by my method follows:

Briefly, the specific steps required are:

(1) Exposing color separations to high contrast silver salt orthochromatic emulsion, such as Kodalith, Reprolith or Photolith, to produce preliminary master silhouette masks of complete opacity, or substantially so, which contain images of none but a specific printing color or others requiring said color in their reproduction, as represented by c—d—e—j—m in FIG. 2.

(2) The further employment of such master masks by combining them in printing relationship with other separations to produce by exposure to contrasty orthochromatic emulsion, additional master silhouette masks of reasonably uniform opacity containing images representing only those colors which require elimination or reduction for their proper reproduction in a specific color printer. These are shown as g—i—k—l—n and o in FIG. 2. Masks thus produced will contain a single color or a combination of colors which require a minor or major degree of correction (mentioned in lines 8 and 9, in column 10) for a specific printer. For example, referring to "a" FIG. 1, it will be seen that the yellow printer requires a minor correction of 30% in areas of pure cyan whereas, a major correction of 65% and 76% is needed in the magenta and purple areas respectively. By following the procedure shown in FIG. 2, a master silhouette mask "i" is produced which contains the minor cyan area correction needed for the yellow printer. By further reference to FIG. 2 it will be seen that a master silhouette mask shown as "g" contains the necessary magenta and purple areas for the major correction of the yellow printer. To either of these can be combined, in printing relationship, the black master silhouette mask "c," produced as shown in FIG. 2, to provide for minor or major correction of black areas in the yellow printer as desired, for 3 or 4 color printing. Master silhouette masks for the correction of the other printers can be made as shown in FIG. 2 or in other suitable ways to produce the desired combinations. The main objective is to produce a master silhouette mask with a combination of colors which require a greater degree of correction in a specific printer and another master mask with combinations of colors which require a lesser degree of correction in said printer.

(3) Producing dye receptive, corrective masks which duplicate the minor and major master mask combinations for the correction of each printer, by exposing said masks to a contrasty orthochromatic emulsion, developing exposed orthochromatic layer in high contrast developer of the Kodalith type, subjecting the developed image to a reversal-bleach bath of the copper-nitrate, glacial acetic, hydrogen peroxide type and fixing in the usual acid hypo bath.

To this point two things have been accomplished. First, the minor and major adjustments for each printer have been recorded on master silver image silhouette masks of substantially uniform opacity, to provide for over all correction in image areas. Secondly, in duplicating them by the reversal-bleach process, the exposed and developed areas from the masters are completely removed from the emulsion base or support to render those areas non-receptive to dye, while replacing the unexposed areas with a deposit which is dye receptive to the extent of its thickness on the emulsion base or support. The dye receptive masks thus produced are subsequently dyed in different colors for use in the actual correction of the separations.

(4) Production of screened color printers for reproduction by my process requires that the dyed corrective masks of minor and major adjustments for each printer be registered in printing relationship to the printer separation and the combination exposed by white light through a dye colored variable opacity reproduction screen because the contrast range of such screens can be regulated by the color of light to which they are exposed. It is common knowledge that yellow, or other colors containing yellow in their mixture, reduces the contrast range of a magenta dye colored variable opacity reproduction screen when those colors are projected through it for the purpose of producing a screened image on a contrasty orthochromatic emulsion. It is also known that blue, purple and violet react differently by increasing the contrast range of the screen (as shown in FIG. 3).

Whereas screens of this type are designed to adjust contrast over the entire area of a reproduction by all over illumination of a certain color, this novel method employs them to greater advantage. Because minor and major corrective masks are dissimilar in image and color, they form multicolor patterns when placed in register upon the proper separations. When the combination of masks, in suitable colors, and printer separation is exposed by white light through a magenta dye colored variable opacity reproduction screen, it becomes capable of producing multi-contrast adjustments in different areas of a reproduction. Choice of dye color is determined by the extent of contamination or over-saturation of another color in its mixture with the wanted printer color. Dye colors are chosen for their ability, in full strength, to change the contrast of the screen rather than depend upon stronger or weaker application of a non actinic color to add density to the mask. Application of dye to the masks by swabbing is both fast and efficient although brushing is none the less effective. Application of suitable transparent dye colors in full strength to the receptive masks produces the necessary minor and major corrective masks for each printer. They are shown in FIG. 4 as "b" amber dye mask for major yellow printer correction— "c" blue dye mask for minor yellow printer correction— "h" amber dye mask for major magenta printer correction— "g" yellow dye mask for minor magenta printer correction— "k" yellow dye mask for minor blue correction— "o" amber dye mask for major black printer correction for 4 color printing— "n" blue dye mask for minor black printer correction for 4 color printing— "a" blue or amber dye mask for major or minor printer corrections as desired, for 3 or 4 color printing. In the first three illustrations of FIG. 4 the black areas of the corrected yellow, magenta and blue printers are shown as they would appear if a cyan dye mask "a" is used for three color printing which requires the three primaries to produce black. However, in four color printing an amber dye mask "a" is used, in which case the black areas of the corrected primary printers would appear with less density.

(5) After dyeing the corrective masks in the manner and colors described above, they are combined in printing relationship, by taping or other suitable means, with the specific printer separation for which they were made. FIG. 4 shows these combinations to be masks "a," "b," "c" on yellow printer separation—"a," "g," "h" on magenta printer separation—"a," "k" on blue printer separation and "n," "o" on the black printer separation if subject is reproduced in 4 colors. Each printer with its corrective mask combination is exposed by white light through a magenta dye colored variable opacity reproduction screen to a contrasty orthochromatic emulsion of the type previously mentioned, to produce a corrected printer which is fully saturated in its wanted color because those areas are clear and unobstructed in the masks, and corrected in greater or lesser degree as desired in other areas, to eliminate contamination or reduce oversaturation by the reaction of the different dye colors of the masks to the magenta dye colored variable opacity reproduction screen.

If after proofing the corrected printers further adjustments are necessary because of error in dye choice, or as is often the case in reproducing an improperly exposed color transparency where departure from the original is desirable, correction can be made by removing the dye with a suitable bleach and redyeing the mask with a more effective color.

In the development of the present invention, it is essential to record each of the pure printing colors and others requiring specific combinations to produce another color by their mixture. For this purpose, silver image silhouette masks (mentioned in column 10, line 13, are produced of substantial opacity, and whose images contain a specific color or a combination of wanted colors. They will be described hence-forth as master silhouette masks. They are made by exposure of the separations to contrasty orthochromatic emulsion of the Eastman Kodalith type and others and developed in a high contrast developer such as Eastman Kodalith or others used for line reproduction. The character of such emulsion and developer produces substantially uniform opacity from portions of the separation which are only 10% more transparent than the separation density of another color, without recording the adjacent color. By exposing about 75% of the time required for a normal line reproduction and overdeveloping to substantial opacity in the desired color, a master silhouette mask is produced. Exposure time is not critical because development is performed in adequate light during processing and can be stopped when the desired image reaches opacity. An exposure for the black master silhouette mask through the combined separation "A" and "D," FIG. 1, when developed and stopped at the semblance of an image in the purple areas will record black minus all other colors. When dried, the master silhouette mask of the black record is combined with the black separation "D," exposed, developed and stopped when the green areas begin to appear. This produces a master silhouette mask of the purple area. From this point on, each new master silhouette mask is added to those made previously, to produce the succeeding masks. To eliminate the necessity of reregistering, the masks are attached to each other with a double adhesive tape to permit their removal as a unit when transferring the set from one separation to another. Thus, each new mask is added to the previous assembly.

Figure 1:
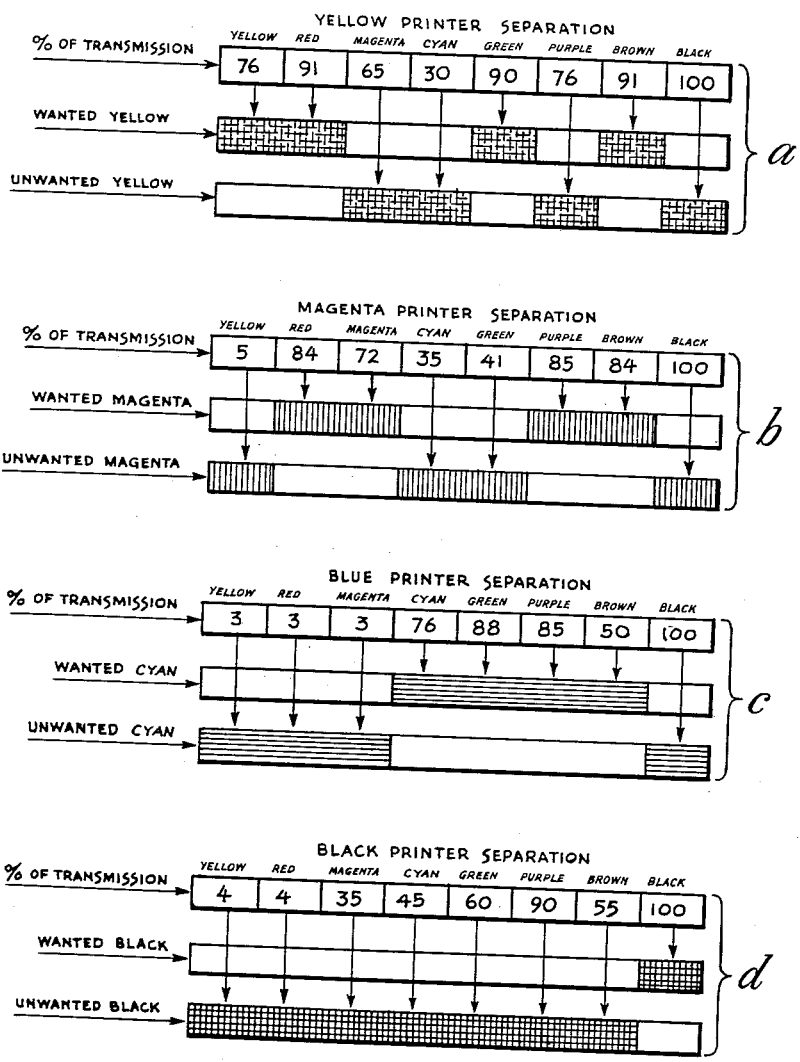
FIG. 1 is a chart representing four standard separation negatives, the approximate proportion of other colors registered therein as compared to 100% black and the relation of wanted and unwanted colors in each negative.

Next, the master silhouette mask of the green areas is made by combining the yellow and cyan printer separations "A" and "C," FIG. 1, with the black and purple master silhouette masks. After exposure, it is developed and stopped when the brown area begins to appear. After drying, it is added to the combination from which it was made i.e. separation "A" and "C," FIG. 1, plus black and purple master silhouette masks, to produce the brown area master silhouette mask. The new combination is then exposed and development stopped when the cyan area begins to appear. The brown master silhouette mask, after drying and fixing is added to the black, purple and green master silhouette masks on the cyan printer separation "C". It is then exposed and developed to include the cyan areas, then fixed and dried. The blue master silhouette mask is then added to the black, purple, green and brown master silhouette masks in combination with the magenta printer separation "B" to produce the red master silhouette mask. After exposure, its development is stopped when magenta areas appear. It is fixed, dried and added to the combination from which it was made, then exposed and developed to record the magenta areas of the original. The magenta master silhouette mask is added to the black, purple, green, brown, blue and red masks in combination with the yellow printer separation "A" to produce the yellow area master silhouette mask.

By following the above-described procedure, it is possible to produce a complete set of master silhouette masks, each of which bears an image of a specific color. Thus, a combination of masks can be assembled to correct specific distorted colors without affecting those which require full saturation of wanted color. The yellow printer separation "A" in FIG. 1 shows three colors which should contain no yellow, namely, magenta, cyan and purple. By assembling the master silhouette mask of each of these colors, a combination is produced which requires complete cancellation of yellow. "A", FIG. 1, also shows oversaturation of approximately 0.15 in red, green and brown areas. Assembling the master silhouette mask of these colors produces a combination which requires the same proportion of reduction to equalize them in relation to pure yellow areas. The black area of "A,"

FIG. 1, requires 0.24 reduction if used in three-color process reproduction and more than 0.50 if used in four-color process. Thus, with two assembled combinations and one individual mask, it is possible to segregate the proportion of correction needed for color removal of varying percentages. The processing and application of transparent dye silhouette masks will be explained fully in succeeding paragraphs.

The magneta printer "B" in FIG. 1 shows contamination magneta which must be eliminated from blue and green. A combination master silhouette mask of the two colors provides for their cancellation. "B," FIG. 1, also reveals that red, purple and brown are oversaturated approximately 0.13 as compared to the wanted solid magenta. A combination mask of these individual colors provides a master silhouette mask of these colors without disturbing the wanted color areas. Again, the individual black master silhouette mask allows adjustment for three or four-color processes. The cyan printer separation "C," FIG. 1, reveals contamination in yellow, red and magenta areas which must be eliminated along with 0.09 oversaturation in purple. A master silhouette mask combination of these colors provides for the reduction in purple, while eliminating cyan from the other three. FIG. 2, "C," also shows oversaturation of 0.12 in brown and green as compared to wanted solid cyan areas. A combination of the brown and green master silhouette masks provides for reduction necessary to equalize their relationship to cyan. The individual black master silhouette mask allows adjustment for three or four-color reproduction processes. The black printer separation "D," FIG. 1, can be corrected by assemblying master silhouette masks of all colors excepting black for a combination which requires the complete removal of black.

By combining individual master silhouette masks of specific colors as described above, correction is restritced to distorted color areas only. While the master silhouette masks and their combination explained demonstrate the theoretical possibility of correction by the invention, it is possible to obtain essentially the same result by fewer individual operations. A suitable alternate method which achieves a highly acceptable result is illustrated in FIG. 2. The masks produced by this method are exposed and processed in the same manner as the individual masks described. All masks described below are of the silhouette type.

An exposure through the combined black printer separation, FIG. 2, "A," and yellow printer separation "B" produces black area silhouette mask "C." A combination of mask "C" and black printer separation "A" produces purple area mask "D." By combining mask "D" with yellow printer separation "B," a mask "E" is produced which contains all colors requiring yellow in their mixture if development is stopped when magenta area appears. When mask "E" is combined with magenta printer separation "F," a mask "G" is produced that records the magenta and purple areas to be cancelled from the final yellow printer. Likewise, when mask "E" of wanted yellow areas is combined with cyan printer separation "H," the resultant mask "I" will eliminate the blue and purple areas of the yellow printer. If magenta printer separation "F" is exposed and development stopped when green area appears, a mask "J" is produced which records all colors having magenta in their mixture. A combination of mask "J" and yellow printer separation "B" will provide mask "K" whose image contains the yellow and green areas to be reduced in the final magenta printer. When mask "J" is combined with cyan printer separation "H," a mask "L" is produced which can eliminate the cyan and green areas in the magenta printer. Cyan printer separation "H" is used to make mask "M" which, if development is stopped when brown appears, bears an image of all colors containing cyan in their mixture. Combining mask "M" with yellow printer separation "B" produces mask "N" which is used to remove yellow and reduce oversaturation in the brown area of the cyan printer. A combination of black mask "C" on black printer separation "A" will produce mask "O" which registers colors that can be contaminated in the black printer. This will be covered when black printer processing is described later.

The above method produces master silhouette masks with images that require major and minor correction grouped photographically in proper relationship. While the diagram drawings of FIG. 2 may appear as separate operations, many, in fact, can be processed simultaneously.

The silver image silhouette masks produced in FIG. 2 become the masters from which transparent-dye color corrective silhouette masks are made. The dye color silhouette masks have a four-fold function in the system of correction. First, they provide a photomechanical record in silhouette of various areas of colors that must be corrected because of the usual distortion in all standard separations. Secondly, they can be made or assembled to supply a combination of images of colors requiring approximately the same proportion of correction without affecting the pure printing color or its wanted mixture in other colors. Third, they provide a standardized method that applies to all originals, thus eliminating the guesswork in producing special continuous tone masks for various types of subjects. Finally, the masks are of such character as to provide images that permit full saturation of a predetermined dye color, which, when exposed through a dye layer of another color, produces various contrasts and balances in precise areas of the final color printer.

The silhouette dye masks used for final correction can be made on diazotype material, such as ozalid, which produces a clear dye image by ammonia fume development. Or, they can be made on standard contrasty orthochromatic emulsion such as Eastman Kodalith, Ansco Reprolith or DuPont Photolith which, after exposure and development, can be processed by the reversal method to produce clear dye receptive deposits that duplicate the master masks or combinations. The nature of the latter type is such that application of dye defines the unexposed and bleached silver halide deposit, leaving the remaining portions colorless. The reversal type mask has an advantage over the other in that error of dye choice can be corrected by bleaching and re-application of proper color without remaking the mask.

A typical application, FIG. 3, shows the changes of contrast that can be obtained in various portions of a color printer by a combination of dye color images exposed through both a typical continuous tone silver image of a separation and a magenta dye colored variable opacity reproduction screen. The magenta colored screen used in this demonstration was chosen because it is available at present and craftsmen are familiar with its characteristics and uses. However, the same results can be accomplished with a reproduction screen of another dye color by changing the colors of the masks.

"A" to "D" inclusive of FIG. 3, illustrate the results obtained with transparent dye silhouette masks, each dyed with a different color. "E" to "I" inclusive show what changes result from a combination of two masks of similar images each of which are dyed with different colors. "A" demonstrates the effect of a yellow dye masking positive from this combination shows 20% and 100% transmission by projection through a magenta dye colored variable opacity reproduction screen. The resulting positive from this combination shows 10% and 100% density from the clear areas of the mask, whereas the yellow portions of the mask have a 15% and 60% ratio.

The reaction of the yellow image superimposed on the said magenta screen through which the corrected final positive is made, changes the contrast characteristic of the screen, leaving the clear areas to reproduce normally. As further evidence that the combined colors of the mask and the dye colored variable opacity reproduction screen can change the contrast of the positive print, "B" demonstrates what changes occur with the use of a blue mask. Here, the clear areas of the mask again register the 20% and 100% areas, while the blue areas of the mask in combination with the magenta of the reproduction screen have produced a positive of entirely different proportion of correction in the blue areas of "B" and the yellow areas of "A." "C" and "D" indicate the changes in contrast in a positive when the mask dye colors used are chrome yellow and amber yellow. Here the correction in the resultant positives has ratio of 10%–50% and 0%–45% respectively in the dye areas. FIGS. "E" and "F" show how the combination of a yellow dye mask with either of the chrome yellow of "C" or the amber of "D" has effected no change in correction or contrast range in comparison with FIGS. "C" and "D". However, as shown in "G," "H," "I," an entirely different balance of correction and contrast occurs when the blue mask used in "B" is used in combination with yellow mask of "A" or the chrome yellow mask of "C," or the amber mask of "D." The dye areas of the combined masks have produced correction and contrast in the areas of 10%–60%, 5%–50% and 0%–0% respectively.

The three combined masks of "J" show how changes can occur in a final positive when dye images overlap in certain areas to form a mixture of colors that can change the proportion of correction by greater or lesser degrees. Other pre-determined combinations can produce an entirely different proportion of correction and contrast.

The actual application of the foregoing method to the correction of color separation negatives follows:

A set of separations using standard filters and panchromatic material are made in the usual manner. The master silver image silhouette masks of FIGS. 2, C, G, I, are contacted and exposed on contrasty orthochromatic emulsion. After developing and washing they are immersed in a reversal bath which completely removes the exposed and developed areas from the emulsion base and renders those areas non-receptive to dye, while replacing the unexposed areas with a dye receptive deposit which duplicates the positive image of the master. The reversal is then fixed and cleared in an acid hypo bath. The nature of the reversed image is such as to accept dye in full saturation to the extent of its thickness on the emulsion base or support. A copper nitrate glacial acetic type of reversal is recommended. Although silhouette dye masks will function equally well if made on diazo type material, such as ozalid, this description is confined to the use of conventional contrasty orthochromatic emulsions because of their more common use. After fixing and drying the reversals are fastened (reversal side up) to a suitable large glass with tape and dyed in the following manner: Corrective mask "G" FIG. 2 is swabbed on the image surface with a transparent amber dye of such consistency as to imbed into the deposit portion, a full saturation of color. Corrective mask #1 is treated likewise, except that a transparent blue dye which permits full saturation is used. Thus a blue dye and an amber dye corrective silhouette mask is produced bearing images of unwanted yellow which must be reduced in various degrees to correct the yellow printer. The importance of using the precise color of dye in full saturation for the correction of all printers is to prevent overcorrection in colors which have mixtures of other colors in them. As an example:

If all the cyan areas in the yellow printer separation are completely eliminated in the yellow printer, the final reproduction would contain no blue-green which needs some mixture of yellow with pure blue. Thus, if the correction of pure cyan is confined to approximate the contamination of 30%, all blues containing yellow in their mixture would not be minus yellow. The same holds for other mixtures.

FIGURE 4 illustrates actual application of corrective transparent dye silhouette mask combinations and colors needed to adjust the unbalanced separations for each printer color. Choice of silhouette mask colors is based on use of a magenta dye colored variable opacity reproduction screen. Silhouette masks of other suitable colors must be used if color of reproduction screen is other than magenta.

FIG. 4—Yellow printer correction demonstrates the applications and results of dyed silhouette masks when used in combination with the panchromatic separation image and a magenta dye colored variable opacity reproduction screen.

A represents blue dyed reversal made from silhouette master mask C, FIG. 2
B represents amber dyed reversal made from silhouette master mask G, FIG. 2
C represents blue dyed reversal made from silhouette master mask I, FIG. 2
D represents uncorrected yellow printer separation
E represents magenta dye colored variable opacity reproduction screen
F represents corrected yellow printer The masking of the black area "A" in FIG. 4 permits a closer relationship in the solid wanted yellow areas by producing the printer to a higher contrast.

FIG. 4—Magenta printer correction:
A represents blue dyed reversal made from silhouette master mask C, FIG. 2
G represents yellow dyed reversal made from silhouette master mask D, FIG. 3
H represents blue dyed reversal made from silhouette master mask F, FIG. 3
I represents uncorrected magenta printer negative
E represents magenta dye colored variable opacity reproduction screen
J represents corrected magenta printer.

Corrected magenta printer J is made of a contrast to produce a closer relationship in solid wanted colors.

FIG. 4—Cyan printer correction:
A represents blue dyed reversal made from master silhouette mask C, FIG. 2
K represents yellow dyed reversal made from master silhouette mask D, FIG. 4
L represents uncorrected cyan printer negative
E represents magenta dye colored variable opacity reproduction screen
M represents corrected cyan printer.

Reduction in cyan mask of black area allows blue printer to be made of a higher contrast, thus creating a closer relationship in the solid areas of wanted cyan.

FIG. 4—Black printer correction:
N represents blue dyed reversal made from master silhouette mask D, FIG. 5
O represents amber dyed reversal made from master silhouette mask E, FIG. 5
P represents uncorrected black printer negative
E represents magenta dye colored variable opacity reproduction screen
Q represents corrected black printer The black printer produced by this method is of the type most generally used which recommends a positive that is considerably less than a full scale duplication of the separation. Since it is desirable in this type of black printer to confine the image to shadow and dark detail areas only, the positive is produced of such contrast as to eliminate areas of less than 30% transmission in the printer negative. Thus, the 4% areas of contamination in the printer negative are automatically eliminated.

It will now be apparent that the novel process accomplishes the correction of unbalanced color separations in a simplified and controllable manner, making it possible to employ craftsmen of average skill for the attainment of consistently high quality in the final reproduction.

While I have described the invention along specific lines, various minor changes or refinements may be made therein without departing from its principle, and I reserve the right to employ all such changes and refinements as may come within the scope and spirit of the appended claims.

I claim:

1. In a photomechanical process for the production of properly balanced primary color printers for at least a three color printing process, which comprises preparing a set of corrective dye image silhouette masks each member of which is made by printing in register an uncorrected primary color printer separation and a preliminary silver image silhouette record of other color areas desired to be controlled, onto a light sensitive high contrast orthochromatic layer capable of producing gammas of four to ten, when processed in a high contrast paraformaldehyde developer, to produce master silver image silhouette masks of uniform density and thereafter projecting light through said master silhouette masks onto a light sensitive high contrast orthochromatic layer, developing exposed portions of said layer in a high contrast paraformaldehyde developer and producing a reversed dye image on the resulting corrective silhouette masks and projecting white light through each of at least three uncorrected primary color printer separations superimposed on a dye colored variable opacity reproduction screen and at least two corrective transparent dye image silhouette masks superimposed on each of said uncorrected primary color separations, onto a light sensitive high contrast orthochromatic layer capable of producing gammas of four to ten when processed with a paraformaldehyde developer, each corrective silhouette mask being dyed to uniform intensity in areas corresponding to areas of color distortion in the uncorrected primary color printer separations which are to appear in reduced density in the corrected primary color printers and being substantially transparent elsewhere, one of said corrective silhouette masks being dyed in areas corresponding to the record of the true black areas of the original only, and others of said corrective silhouette masks being dyed in areas corresponding to the non-black areas of the original which are to appear in reduced density in the corrected primary color printers, the colors of the dyes in said corrective silhouette masks being selected so that in combination with the color sensitivity of the orthochromatic layer and the color of the dye colored variable opacity reproduction screen, a reduction of said densities occurs in said areas upon exposure and development.

2. In a photomechanical process for the production of properly balanced primary color printers from uncorrected primary color printer separations of an original multicolored subject, the method of making a preliminary silver image silhouette mask of substantially uniform density in the purple aspects of said subject, for use in making another preliminary silver image silhouette mask which records only the areas of the original which contain the true yellow printer color and others which require it in their mixtures, which comprises combining an uncorrected black printer separation and an uncorrected yellow printer separation in printing relationship, projecting light through the combination onto a light sensitive high contrast orthochromatic layer capable of producing gammas of four to ten, developing said layer in a high contrast paraformaldehyde developer, exposure and development being such as to produce a silver image silhouette mask of substantially uniform opacity in areas of said black aspects and substantially transparent elsewhere and thereafter combining said preliminary silhouette mask and an uncorrected black printer separation in printing relationship, projecting light through the combination onto a light sensitive high contrast orthochromatic layer and developing said layer in a high contrast paraformaldehyde developer, exposure and development being such as to produce a preliminary silver image silhouette mask of substantially uniform opacity in areas of said purple aspects of the original subject and substantially clear in all other color areas.

3. In a photomechanical process for the production of properly balanced primary color printers from uncorrected primary color printer separations of an original multicolored subject, the method of making a preliminary silver image silhouette mask of substantially uniform density in areas corresponding to color areas of the original subject which contain a true printer color and others which require it in their mixtures for the production of a master silver image silhouette mask of uniform density in areas of color distortion in the uncorrected primary color printer separations which are to appear in reduced density in the corrected primary color printers, which comprises combining in printing relationship a preliminary silver image silhouette mask of substantially uniform density in the purple aspects of said original subject produced by the method of claim 2, and an uncorrected yellow printer color separation, projecting light through the combination onto a light sensitive high contrast orthochromatic layer capable of producing gammas of four to ten, processing said layer in a high contrast paraformaldehyde developer, exposure and development being such as to produce a preliminary silver image silhouette mask of substantially uniform opacity which records only areas of the original which contain the true yellow printer color and others which require it in their mixtures and otherwise substantially clear in all other color areas.

4. In a photomechanical process for the production of properly balanced primary color printers from uncorrected primary color printer separations of an original multicolored subject, the method of making a master silver image silhouette mask of substantially uniform density in areas of color distortion in an uncorrected yellow printer color separation which require major adjustment to produce a corrected yellow color printer, said master mask being used in the production of a corrective dye image silhouette mask, which comprises combining in printing relationship an uncorrected magenta printer color separation and a preliminary silver image silhouette mask of substantially uniform opacity which records the areas of the original which contain only the true yellow printer color and others which require it in their mixtures produced by the method of claim 3, projecting light through the combination onto a light sensitive high contrast orthochromatic layer capable of producing gammas of four to ten, developing said layer in a high contrast paraformaldehyde developer, exposure and development being such as to produce a master silver image silhouette mask of substantially uniform opacity which records only the color areas which require major adjustment to produce a corrected color printer and otherwise substantially clear in all other color areas.

5. In a photomechanical process for the production of properly balanced primary color printers from uncorrected primary color printer separations of an original multicolored subject, the method of making a master silver image silhouette mask of substantially uniform density in areas of color distortion in an uncorrected yellow printer color separation which require minor adjustment to produce a corrected yellow color printer, said master mask being used in the production of a corrective dye image silhouette mask, which comprises combining in printing relationship, an uncorrected cyan printer color separation and a preliminary silver image silhouette mask of substantially uniform opacity which records the areas of the original which contain only the true yellow printer color and others which require it in their mixtures produced by the method of claim 3, projecting light through the combination onto a light sensitive high contrast orthochromatic layer capable of producing gammas of four to ten, developing said layer in a high contrast paraformaldehyde developer, exposure and development being such as to produce a master silver image silhouette mask of substantially uniform opacity which records only the color areas which require minor adjustment to produce a corrected color printer and otherwise substantially clear in all other color areas.

6. In a photomechanical process for the production of properly balanced primary color printers from uncorrected primary color separations of an original multicolored subject, the method of claim 1, wherein the reversed dye image is produced by reversal in a copper nitrate, hydrogen peroxide, potassium bromide and glacial acetic solution which completely dissolves the developed original exposure leaving an offwhite inversed dye receptive silhouette image of undeveloped silver halide which is subsequently cleared and fixed in an acid hypo bath and dyed with a transparent color.

7. In the method of claim 1, wherein at least one of the said corrective dye image silhouette masks, made by a reversal and dyeing process, is confined to areas corresponding to those which require major tonal adjustment in the production of a correct printer, the said dye image being of substantially uniform intensity and of such actinic color that, in combination with the color of a dye colored variable opacity reproduction screen, and the color sensitivity of a high contrast light sensitive orthochromatic layer, corresponding degrees of major tonal adjustments occur in the masked areas only, during the final printing steps of preparing a corrected printer.

8. In the method of claim 1, wherein at least one of the said corrective dye image silhouette masks, made by a reversal and dyeing process, is confined to areas corresponding to those which require minor tonal adjustments in the production of a correct printer, the dye image color differing from that used to produce major tonal adjustments and being of a substantially uniform intensity of such actinic color that, in combination with the color of a dye colored variable opacity reproduction screen and the color sensitivity of a high contrast light sensitive orthochromatic, corresponding degrees of major tonal adjustments occur in the masked areas only, during the final printing steps of preparing a corrected printer.

9. In a photomechanical process for the production of properly balanced primary color printers from uncorrected primary printer separations of an original multicolored subject, the method of making corrective dye image silhouette masks of uniform intensity in areas corresponding to the record of the true black aspects of the original subject in the uncorrected primary color printer separations which are to appear in reduced density in the corrected primary color printers, which comprises combining an uncorrected black printer separation and an uncorrected yellow printer separation in printing relationship, projecting light through the combination onto a light sensitive high contrast orthochromatic layer capable of producing gammas of four to ten, developing said layer in a high contrast paraformaldehyde developer, exposure and development being such as to produce a silver image silhouette mask of substantially uniform opacity in areas of said black aspects and substantially transparent elsewhere and thereafter projecting light through said silver image silhouette mask onto a light sensitive high contrast orthochromatic layer, developing exposed portions of said layer in a high contrast paraformaldehyde developer, washing the developed layer and reversing it in a copper nitrate, hydrogen peroxide, potassium bromide and glacial acetic solution which completely dissolves the developed original exposure, leaving an offwhite inversed image of undeveloped silver halide which is subsequently cleared and fixed in an acid hypo bath and dyed with a transparent color to produce a corrective dye image silhouette mask corresponding to the true black areas of the original subject which are to appear in reduced density in the corrected primary color printer.

10. In a photomechanical process for the production of properly balanced primary color printers from uncorrected primary color printer separations of an original multicolored subject, the method of making a corrected yellow color printer, which comprises projecting white light through an uncorrected yellow printer color separation superimposed on a dye colored variable opacity reproduction screen and three corrective transparent dye image silhouette masks superimposed in printing relationship upon said uncorrected printer separation, onto a light sensitive high contrast orthochromatic layer, one of said corrective silhouette masks being dyed in areas corresponding to the record of the black aspects of the original subject, another of said corrective silhouette masks being dyed in areas corresponding to the record of colors which require a major degree of correction in the yellow color printer, the dye being so selected that in combination with uncorrected yellow printer separation, the dye colored variable opacity reproduction screen and the color sensitivity of the orthochromatic layer it will effect a major correction, and a third corrective silhouette mask dyed in areas corresponding to the record of colors which require a minor degree of correction in said printer, the dye being so selected that in combination with the uncorrected yellow printer separation, the dye colored variable opacity reproduction screen and the color sensitivity of the orthochromatic layer it will effect a minor correction, developing exposed layer in a high contrast paraformaldehyde developer to produce a corrected yellow color printer with adjusted areas corresponding to the areas of error in the uncorrected yellow printer color separation.

11. In a photomechanical process for the production of properly balanced primary color printers from uncorrected primary color printer separations of an original multicolored subject, the method of producing specific degrees of reduced densities in different color areas of a corrected yellow printer, said areas corresponding to those of major and minor color distortion in an uncorrected yellow printer color separation, which comprises preparing a set of corrective actinic color dye image silhouette masks, each member of which is made by exposing a silver image silhouette mask to a light sensitive high contrast orthochromatic layer, developing exposed portions of said layer and thereafter producing a reversed dye image on the resulting corrective silhouette mask by a reversal and dyeing process, one of the actinic color corrective masks being made from a silver image silhouette mask corresponding to the record of the magenta and purple aspects of the original subject, and otherwise clear, said actinic color being such that in combination with a color of a dye color variable opacity reproduction screen and the color sensitivity of an orthochromatic layer used to make the corrected yellow printer, it is effective only to the relatively major degree of correction necessary to eliminate yellow from the true magenta aspects of the original, whereby to allow a percentage of yellow to be present in the darkened magenta areas of said original to produce a first dyed mask, and another of the actinic color corrective masks being made from a silver image silhouette mask corresponding to the record of the cyan and purple aspects of the original subject, said actinic color differing from that of the first mask and being such that in combination with the color of a dye color variable opacity reproduction screen and the color sensitivity of an orthochromatic layer used to make the corrected yellow printer, it is effective only to the relatively minor degree of correction necessary to eliminate yellow from the true cyan aspects of the original, whereby to allow a percentage of yellow to be present in the darkened cyan and blue-green aspects of said original to produce a second dyed mask, and still another of the actinic color corrective mask being made from a silver image silhouette mask corresponding to the record of the true black aspects of the original subject, said actinic color differing from that of the first mask and being such that in combination with the color of a dye colored variable opacity reproduction screen and the color sensitivity of an orthochromatic layer used to make the corrected yellow printer, it is effective only to the relatively minor degree of correction necessary to produce an equal density in the true black and true yellow aspects of the original when reproduction is made by a three color process, and, the actinic color differing from that of the second mask and being such as to effect a relatively major degree of correction for under color removal in said black aspects when reproduction is made by a four color process to produce a third mask, superimposing said first, second, and third dyed masks on an uncorrected yellow printer color separation superimposed on a dye colored variable opacity reproduction screen and projecting white light through the resulting combination on to a light sensitive high contrast orthochromatic layer.

12. In a photomechanical process for the production of properly balanced primary color printers from uncorrected primary color printer separations of an original multicolored subject, the method of making a preliminary silver image silhouette mask of substantially uniform density in areas corresponding to the color areas of the original subject which contain a true printer color and others which require it in their mixtures, said preliminary mask being used to produce a master silver image silhouette mask of substantially uniform density in areas of color distortion in an uncorrected magenta printer color separation which require minor adjustment to produce a corrected magenta color printer, which comprises projecting light through an uncorrected magenta printer color separation onto a light sensitive high contrast orthochromatic layer capable of producing gammas of four to ten, processing said layer in a high contrast paraformaldehyde developer, exposure and development being such as to produce a preliminary silver image silhouette mask of substantially uniform opacity which records only the areas of the original which contain the true magenta printer color and others which require it in their mixtures, and otherwise substantially clear in all other color areas, and thereafter combining in printing relationship, said preliminary silver image silhouette mask and an uncorrected yellow printer color separation, projecting light through the combination onto a light sensitive high contrast orthochromatic layer capable of producing gammas of four to ten, processing said layer in a high contrast paraformaldehyde developer, exposure and development being such as to produce a master silver image silhouette mask of substantially uniform opacity which records only the color areas which require minor adjustment to produce a corrected magenta color printer and otherwise substantially clear in all other color areas.

13. In a photomechanical process for the production of properly balanced primary color printers from uncorrected primary color printer separations of an original multicolored subject, the method of making a preliminary silver image silhouette mask of substantially uniform density in areas corresponding to the color areas of the original subject which contain a true printer color and others which require it in their mixtures, said preliminary mask being used to produce a master silver image silhouette mask of substantially uniform density in areas of color distortion in an uncorrected magenta printer color separation which require major adjustment to produce a corrected magenta color printer, which comprises combining in printing relationship, a preliminary silver image silhouette mask of the true magenta aspects of the original subject produced by the method of claim 12, and an uncorrected cyan printer color separation, projecting light through the combination onto a light sensitive high contrast orthochromatic layer capable of producing gammas of four to ten, processing said layer in a high contrast paraformaldehyde developer, exposure and development being such as to produce a master silver image silhouette mask of substantially uniform opacity which records only the color areas which require major adjustment to produce a corrected magenta color printer, and otherwise substantially clear in all other color areas.

14. In a photomechanical process for the production of properly balanced primary color printers from uncorrected primary color printer separations of an original multicolored subject, the method of making a corrected magenta color printer which comprises projecting white light through an uncorrected magenta printer color separation superimposed on a dye colored variable opacity reproduction screen and three corrective transparent dye image silhouette masks superimposed in printing relationship, upon said uncorrected printer separation, onto a light sensitive high contrast orthochromatic layer, one of said corrective silhouette masks being dyed in areas corresponding to the record of the black aspects of the original subject, another of said corrective silhouette masks being dyed in areas corresponding to the record of colors which require a minor degree of correction in the yellow color printer, the dye being so selected that in combination with the uncorrected magenta printer separation, the dye colored variable opacity reproduction screen and the color sensitivity of the orthochromatic layer it will effect a minor correction, and a third corrective silhouette mask dyed in areas corresponding to the record of colors which require a major degree of correction in said printer, the dye being so selected that in combination with the uncorrected magenta printer separation, the dye colored variable opacity reproduction screen and the color sensitivity of the orthochromatic layer it will effect a major correction, developing exposed layer in a high contrast paraformaldehyde developer to produce a corrected magenta color printer with adjusted areas corresponding to the areas of error in the uncorrected magenta printer color separation.

15. In a photomechanical process for the production of properly balanced primary color printers from uncorrected primary color printer separations of an original multicolored subject, the method of producing specific degrees of reduced densities in different color areas of a corrected magenta printer, said areas corresponding to those of major and minor color distortion in an uncorrected magenta printer color separation, which comprises preparing a set of corrective actinic color dye image silhouette masks, each member of which is made by exposing a silver image silhouette mask to a light sensitive high contrast orthochromatic layer, developing exposed portions of said layer and thereafter producing a reversed dye image on the resulting corrective silhouette mask by a reversal and dyeing process, one of the actinic color corrective masks being made from a silver image silhouette mask corresponding to the record of the cyan and green aspects of the original subject, and otherwise clear, said actinic color being such that in combination with a color of a dye color variable opacity reproduction screen and the color sensitivity of an orthochromatic layer used to make the corrected magenta printer, it is effective only to the relatively major degree of correction necessary to eliminate magenta from the true cyan aspects of the original, whereby to allow a percentage of magenta to be present in the darkened cyan and green areas of said original to produce a first dyed mask, and another of the actinic color corrective masks being made from a silver image silhouette mask corresponding to the record of the yellow and green aspects of the original subject said actinic color differing from that of the first mask and being such that in combination with the color of a dye color variable opacity reproduction screen and the color sensitivity of an orthochromatic layer used to make the corrected magenta printer, it is effective only to the relatively minor degree of correction necessary to eliminate magenta from the true yellow aspects of the original, whereby to allow a percentage of magenta to be present in the darkened yellow and green aspects of said original to produce a second dyed mask, and still another of the actinic color corrective mask being made from a silver image silhouette mask corresponding to the record of the true black aspects of the original subject said actinic color differing from that of the first mask and being such that in combination with the color of a dye colored variable opacity reproduction screen and the color sensitivity of an orthochromatic layer used to make the corrected magenta printer, it is effective only to the relatively minor degree of correction necessary to produce an equal density in the true black and true magenta aspects of the original when reproduction is made by a three color process, and, the actinic color differing from that of the second mask and being such as to effect a relatively major degree of correction for under color removal in said black aspects when reproduction is made by a four color process to produce a third mask, superimposing said first, second, and third dyed masks on an uncorrected magenta printer color separation superimposed on a dye colored variable opacity reproduction screen and projecting white light through the resulting combination on to a light sensitive high contrast orthochromatic layer.

16. In a photomechanical process for the production of properly balanced primary color printers from uncorrected primary color printer separations of an original multicolored subject, the method of making a preliminary silver image silhouette mask of substantially uniform density in areas corresponding to the color areas of the original subject which contain a true printer color and others which require it in their mixtures, said preliminary mask being used to produce a master silver image silhouette mask of substantially uniform density in areas of color distortion in an uncorrected cyan printer color separation which require minor adjustment to produce a corrected cyan color printer, which comprises projecting light through an uncorrected cyan printer color separation onto a light sensitive high contrast orthochromatic layer capable of producing gammas of four to ten, processing said layer in a high contrast paraformaldehyde developer, exposure and development being such as to produce a preliminary silver image silhouette mask of substantially uniform opacity which records only the areas of the original which contain the true cyan printer color and others which require it in their mixtures, and otherwise substantially clear in all other color areas, and thereafter combining it in printing relationship with an uncorrected yellow printer color separation, projecting light through the combination onto a light sensitive high contrast orthochromatic layer capable of producing gammas of four to ten, processing said layer in a high contrast paraformaldehyde developer, exposure and development being such as to produce a master silver image silhouette mask of uniform opacity which records only the color areas which require minor adjustment to produce a corrected cyan color printer and otherwise substantially clear in all other color areas.

17. In a photomechanical process for the production of properly balanced primary color printers from uncorrected primary color printer separations of an original multicolored subject, the method of making a corrected cyan color printer, which comprises projecting white light through an uncorrected cyan printer color separation superimposed on a dye colored variable opacity reproduction screen and two corrective transparent dye image silhouette masks superimposed in printing relationship upon said uncorrected printer separation, onto a light sensitive high contrast orthochromatic layer, one of said corrective silhouette masks being dyed in the areas corresponding to the record of the black aspects of the original subject, and another corrective silhouette mask being dyed in areas corresponding to the record of colors which require a minor degree of correction in the cyan color printer, the dye being so selected that in combination with the uncorrected cyan printer separation, the dye colored variable opacity reproduction screen and the color sensitivity of the orthochromatic layer it will effect a minor correction, developing exposed layer in a high contrast paraformaldehyde developer to produce a corrected cyan color printer with adjusted areas corresponding to the areas of error in the uncorrected cyan printer color separation.

18. In a photomechanical process for the production of properly balanced primary color printers from uncorrected primary color printer separations of an original multicolored subject; the method of producing specific degrees of reduced densities in different color areas of a corrected cyan printer, said areas corresponding to those of minor and major color distortion in an uncorrected cyan printer color separation, which comprises preparing a set of corrective actinic color dye image silhouette masks, each member of which is made by exposing a silver image silhouette mask to a light sensitive high contrast orthochromatic layer, developing exposed portions of said layer and thereafter producing a reversed dye image on the resulting corrective silhouette mask by a reversal and dyeing process, one of the actinic color corrective masks being made from a silver image silhouette mask corresponding to the record of the yellow, red, magenta and brown aspects of the original subject, and otherwise clear, said actinic color being such that in combination with a color of a dye color variable opacity reproduction screen and the color sensitivity of an orthochromatic layer used to make the corrected cyan printer, it is effective only to the relatively minor degree of correction necessary to eliminate cyan from the true yellow, red, and magenta aspects of the original, whereby to allow a percentage of cyan to be present in the darkened yellow, red, magenta and brown areas of said original to produce a first dyed mask, and another actinic color corrective mask being made from a silver image silhouette mask corresponding to the record of the true black aspects of the original subject, said actinic color differing from that of the first mask and being such that in combination with the color of a dye colored variable opacity reproduction screen and the color sensitivity of an orthochromatic layer used to make the corrected cyan printer, it is effective only to the relatively major degree of correction necessary to produce an equal density in the true black and true cyan aspects of the original when reproduction is made by a three color process, and an actinic color differing from that used for a three color process being such as to effect a greater degree of correction for under color removal in said black aspects when reproduction is made by a four color process to produce a second mask, superimposing said first, and second dyed masks on an uncorrected cyan printer color separation superimposed on a dye colored variable opacity reproduction screen and projecting white light through the resulting combination on to a light sensitive high contrast orthochromatic layer.

19. In a photomechanical process for the production of a properly balanced black printer from an uncorrected black printer separation of an original multicolored subject, the method of making a master silver image silhouette mask of substantially uniform density in areas corresponding to the record of the non-black aspects of the original subject which require major correction to produce a properly adjusted black printer, said master mask being used in the production of a corrective dye image silhouette mask, which comprises combining an uncorrected yellow printer color separation and an uncorrected black printer separation in printing relationship, projecting light through the combination onto a light sensitive high contrast orthochromatic layer capable of producing gammas of four to ten, developing said layer in a high contrast paraformaldehyde developer, exposure and development being such as to produce a silver image mask of substantially uniform opacity which records only the true black aspects of the original subject, and thereafter combining it and an uncorrected black printer separation in printing relationship, projecting light through the combination onto a light sensitive high contrast orthochromatic layer capable of producing gammas of four to ten, processing said layer in a high contrast paraformaldehyde developer, exposure and development being such as to produce a master silver image silhouette mask of substantially uniform opacity which records only the non-black areas which require major adjustment to produce a corrected black printer and otherwise substantially clear in all other color areas.

20. In a photomechanical process for the production of a properly balanced black printer from an uncorrected black printer separation of an original multicolored subject, which comprises projecting white light through an uncorrected black printer separation superimposed on a dye colored variable opacity reproduction screen and two corrective transparent dye image silhouette masks superimposed in printing relationship upon said uncorrected printer separation, onto a light sensitive high constrast orthochromatic layer, one of said corrective silhouette masks being dyed in areas corresponding to the record of non-black colors which require a major degree of correction in the black printer, and another corrective silhouette mask being dyed in areas corresponding to the record of the purple areas of the original subject, the dye being so selected that in combination with the uncorrected black printer separation, the dye colored variable opacity reproduction screen and the color sensitivity of the orthochromatic layer it will effect a minor correction, developing exposed layer in a high contrast paraformaldehyde developer to produce a corrected black printer with adjusted areas corresponding to the areas of error in the uncorrected black printer separation.

21. In a photomechanical process for the production of a properly balanced black printer from an uncorrected black printer separation of an original multicolored subject, the method of producing specific degrees of reduced densities in different color areas of a corrected black printer, said areas corresponding to those of major and minor color distortion in an uncorrected black printer color separation, which comprises preparing a set of corrective actinic color dye image silhouette masks, each member of which is made by exposing a silver image silhouette mask to a light sensitive high contrast othochromatic layer, developing exposed portions of said layer and thereafter producing a reversed dye image on the resulting corrective silhouette mask by a reversal and dyeing process, one of the actinic color corrective masks being made from a silver image silhouette mask corresponding to the record of the magenta, cyan, green, purple, and brown aspects of the original subject, and otherwise clear, said actinic color being such that in combination with a color of a dye color variable opacity reproduction screen and the color sensitivity of an orthochromatic layer used to make the corrected black printer, it is effective only to the relatively major degree of correction necessary to eliminate black from the true green aspects of the original, whereby to allow a percentage of black to be present in the darkest shades of the non-black areas of said original to produce a first dyed mask, and another of the actinic color corrective masks being made from a silver image silhouette mask corresponding to the record of the purple aspects of the original subject said actinic color differing from that of the first mask and being such that in combination with the color of a dye color variable opacity reproduction screen and the color sensitivity of an orthochromatic layer used to make the corrected black printer, it is effective only to the relatively minor degree of adjustment necessary to equalize the correction in the green and purple aspects of the original subject to produce a second dyed mask, superimposing said first, and second dyed masks on a uncorrected black printer color separation superimposed on a dye colored variable opacity reproduction screen and projecting white light through the resulting combination on to a light sensitive high contrast orthochromatic layer.

22. The method of producing a corrected color printer of an original subject that includes making a silver image silhouette mask record of substantially uniform density in certain color aspects of the original, and otherwise clear, said aspects corresponding to those which require tonal adjustment in a corrected printer, by exposing through at least one printing color record containing said aspects, onto a high contrast light sensitive layer, and developing to a silver image silhouette mask record, and then producing a corrective actinic color dye image solhouette mask of substantially uniform density by exposure through said silver image silhouette record to a high contrast light sensitive layer, developing exposed portions and thereafter producing a reversed actinic dye color image in the unexposed areas of said layer by a reversal and dyeing process to thereby produce a corrective actinic color dye image silhouette mask, exposing through said corrective actinic color dye image silhouette mask and an uncorrected color printer record, positioned in front of a dye colored variable opacity reproduction screen, onto a light sensitive layer of such color sensitivity as to produce the degrees of tonal adjustments required, in the uniform density mask areas only, by the actinic relationship of the uniform mask color and the color sensitivity of the light sensitive layer.

References Cited in the file of this patent
UNITED STATES PATENTS

| | | |
|---|---|---|
| 1,237,342 | Johnsen | Aug. 21, 1917 |
| 1,530,076 | Hatt | Mar. 17, 1925 |
| 2,051,161 | Briel | Aug. 18, 1936 |
| 2,124,679 | Wilkinson | July 26, 1938 |
| 2,715,578 | Gresham | Aug. 16, 1955 |
| 2,841,492 | Gresham | July 1, 1958 |

OTHER REFERENCES

Mertle: Photomechanics and Printing, Mertle Publ. Co., Chicago, 1957, page 107. (Copy in Scientific Libr.)